United States Patent [19]

Gunderman et al.

[11] 3,914,360

[45] Oct. 21, 1975

[54] EXPANSION OF EXPANDABLE SYNTHETIC RESINOUS MICROSPHERES

[75] Inventors: Roland E. Gunderman, Clare; Ritchey O. Newman, Jr., Midland, both of Mich.

[73] Assignee: The Dow Chemical Company, Midland, Mich.

[22] Filed: Apr. 23, 1973

[21] Appl. No.: 353,267

[52] U.S. Cl. .................. 264/51; 156/78; 259/4; 260/2.5 B; 264/45.1; 264/109; 264/DIG. 6; 428/402
[51] Int. Cl.² ............................................ C08J 9/16
[58] Field of Search ............ 264/53, 54, 51, DIG. 6, 264/109, 45.1; 156/78, 79; 260/2.5 B; 259/4; 161/DIG. 5

[56] References Cited
UNITED STATES PATENTS

| | | | |
|---|---|---|---|
| 2,797,201 | 6/1957 | Yeatch et al. | 264/54 X |
| 3,404,869 | 10/1968 | Harder | 259/4 |
| 3,583,678 | 6/1971 | Harder | 259/4 |
| 3,615,972 | 10/1971 | Morehouse et al. | 156/79 |
| 3,651,182 | 3/1972 | Rosenthal | 264/54 X |
| 3,666,850 | 5/1972 | Windecker | 264/53 X |

*Primary Examiner*—Edward G. Whitby
*Attorney, Agent, or Firm*—Robert B. Ingraham

[57] ABSTRACT

Expandable synthetic resinous microspheres are expanded in a liquid matrix by passing a dispersion of microspheres in the liquid matrix through an interfacial surface generator.

3 Claims, No Drawings

EXPANSION OF EXPANDABLE SYNTHETIC RESINOUS MICROSPHERES

Expandable synthetic resinous thermoplastic microspheres are a well known and desirable item of commerce and are disclosed at great length in U.S. Pat. No. 3,615,972, the teachings of which are herewith incorporated by reference thereto. Such expandable microspheres are employed in two principal manners: (1) as a dry expandable or expanded microsphere, and (2) as wet expanded or expandable microspheres. In most instances where possible it is usually desired to employ wet microspheres. By "dry microspheres" is meant microspheres, either expandable or expanded, which are not in association with sufficient liquid to eliminate the powdery characteristic of the microspheres. "Wet microspheres" are microspheres in association with a liquid in sufficient quantity to cause clumping together of the microspheres, or if the liquid is present in sufficient quantity, to provide a liquid dispersion of the microspheres. In many instances in the handling of microspheres it is desirable to cause wet microspheres to expand. Considerable effort has been made to optimize the expansion of microspheres in liquid such as water. Generally the maximum volume percent of microspheres has been in the range of about 7.5 percent for wet expansion without undue difficulty. The maximum volume fraction which can be conveniently handled, of course, varies, depending upon the particular expandable microspheres employed and the proportion of blowing agent therein, expansion ratio and the like. When handled in an aqueous slurry, a relatively large portion of water has been necessary for convenient handling. For many applications it is desirable to employ a relatively high proportion of microspheres in a wet system which oftentimes requires removal of a portion of the liquid such as water, oil or the like in which the microspheres have been dispersed. Undesired clumping, fusion and a less than desired degree of expansion are problems which have been encountered when wet microsphere compositions containing higher proportions of microspheres have been expanded.

It would be desirable if there were an improved method for the expansion of wet microspheres.

It would also be desirable if there were available an improved method for the expansion of wet microspheres which would permit the use of a higher proportion of microspheres during the expansion step.

These benefits and other advantages in accordance with the present invention are achieved in a method for the expansion of synthetic resinous microspheres, the steps of the method comprising providing a plurality of expandable synthetic resinous thermoplastic microspheres in association with a liquid dispersing medium wherein the microsphere/dispersing medium mixture is flowable under pressure, heating the mixture of dispersing medium and microspheres to a temperature sufficient to cause expansion of the synthetic resinous thermoplastic microspheres to form a plurality of monocellular gas-filled synthetic resinous particles, the improvement which comprises heating the microspheres by passing the dispersing medium/expandable microsphere mixture through a heated interfacial surface generator.

The method of the present invention is applicable to any and all expandable synthetic resinous microspheres. Dispersing media which are useable in the process of the present invention is any dispersing medium which is generally a non-solvent for and non-reactive with the microspheres at their temperature of expansion.

A wide variety of interfacial surface generators can be employed in the practice of the present invention. Such interfacial surface generators are well known in the art and many are commercially available. Such interfacial surface generators, also sometimes referred to as static mixers, or motionless mixers, are exemplified by the following U.S. Pat. Nos. 3,239,197; 3,286,992; 3,358,749; 3,394,924; 3,404,869; 3,583,678 and 3,620,506, the teachings of which are herewith incorporated by reference thereto. Generally for most applications, the preferred form of interfacial surface generator is one that permits smooth streamline flow of materials therethrough. Particularly desirable interfacial surface generators are shown in U.S. Pat. No. 3,358,749 (particularly the embodiment illustrated in FIG. 1) and U.S. Pat. No. 3,394,924. However, many other interfacial surface generators are operable. In order to minimize the possibility of collapse of the expanded particles and maximize yield of expanded microspheres, interfacial surface generator designs which minimize the possibility of "hangup" or "dead spots" are desirably employed.

Expansion of synthetic resinous microspheres in accordance with the present invention is readily achieved when microspheres are present in a liquid dispersing medium at concentrations up to 30 volume percent, whereas most conventional techniques are satisfactory only up to about 7 volume percent of expandable microspheres.

By way of further illustration, an interfacial surface generator is prepared from a 60 inch length of 2 inch inside diameter thin wall tubing. The interfacial surface generator has the configuration of FIG. 1 of U.S. Pat. No. 3,358,749 and is crimped over a 36 inch length and over the crimped portion and extending over either side is a heat exchange liquid jacket. An aqueous dispersion containing 20 weight percent expandable microspheres having a polymer shell of a copolymer of vinylidene chloride/acrylonitrile is passed through the interfacial surface generator at a rate of about 42 pounds per hour, based on the weight of the dry microspheres while maintaining liquid in the jacket at a temperature of 200°F. The pressure at the inlet end of the crimped tube interfacial surface generator is 40 pounds per square inch. A cake of expanded microspheres is obtained from the exit end of the tube. The microspheres have true densities varying from about 2.1 to about 1.7 pounds per cubic foot. Similar beneficial results are obtained when the foregoing procedure is repeated using 15 weight percent aqueous slurries of similar vinylidene chloride microspheres and 30 weight percent slurries of like microspheres wherein true densities obtained are 4.86 and 4.95 pounds per cubic foot. Expansion of the expandable microspheres is also obtained when a 9 weight percent dispersion of microspheres in mineral oil containing 2 weight percent t-butylstyrene is employed.

In a manner similar to the foregoing illustration, expandable microspheres are expanded employing as the dispersing medium liquid polyester resins, liquid epoxy resins, uncured resole resins, plastisol resin mixtures, wax and curable liquid silicone resins. The appropriate expansion temperature for any given combination of liquid dispersing medium or matrix and microspheres is readily determined by admixing a small quantity of expandable microspheres and the liquid medium, heating the resulting mixture in an air oven and noting the temperature at which expansion of the microspheres occurs, assuming, of course, that the combination of microspheres and liquid dispersing medium has been selected which does not result in destruction of the expandable microspheres.

As is apparent from the foregoing specification, the present invention is susceptible of being embodied with various alterations and modifications which may differ particularly from those that have been described in the preceding specification and description. For this reason, it is to be fully understood that all of the foregoing is intended to be merely illustrative and is not to be construed or interpreted as being restrictive or otherwise limiting of the present invention, excepting as it is set forth and defined in the hereto-appended claims.

What is claimed is:

1. In a method for the expansion of synthetic resinous microspheres, the steps of the method comprising providing a plurality of expandable synthetic resinous thermoplastic microspheres in association with a liquid dispersing medium wherein the micrsophere/dispersing medium mixture is flowable under pressure wherein the concentration of expandable microspheres in the dispersing medium is from about 7 to about 30 volume percent, heating the mixture of dispersing medium and microspheres to a temperature sufficient to cause expansion of the synthetic resinous thermoplastic microspheres to form a plurality of monocellular gas-filled synthetic resinous particles, the improvement which comprises heating the microspheres by passing the dispersing medium/expandable microsphere mixture through a heated interfacial surface generator.

2. The method of claim 1 where the liquid dispersing medium is water.

3. The method of claim 2 where the synthetic resinous microspheres have a shell of vinylidene chloride polymer.

* * * * *